(12) United States Patent
Chou (10) Patent No.: US 10,110,093 B2
(45) Date of Patent: Oct. 23, 2018

(54) MOTOR WITH HEAT DISSIPATION STRUCTURE

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 176 days.

(21) Appl. No.: 15/248,376

(22) Filed: Aug. 26, 2016

(65) Prior Publication Data

US 2017/0070124 A1    Mar. 9, 2017

(30) Foreign Application Priority Data

Sep. 4, 2015    (TW) .............................. 104129435 A (51) Int. Cl.
| | |
|---|---|
| *H02K 9/06* | (2006.01) |
| *H02K 5/20* | (2006.01) |
| *H02K 9/14* | (2006.01) |
| *H02K 5/15* | (2006.01) |

(52) U.S. Cl.
CPC ................. *H02K 9/06* (2013.01); *H02K 5/20* (2013.01); *H02K 9/14* (2013.01); *H02K 5/15* (2013.01)

(58) Field of Classification Search
CPC ................................... H02K 9/06; H02K 5/20
See application file for complete search history.

(56) References Cited

U.S. PATENT DOCUMENTS

| 2,488,365 | A | * | 11/1949 | Abbott | ..................... H02K 9/06 310/62 |
| 3,341,113 | A | * | 9/1967 | Sebok | ................... F04D 17/164 310/62 |
| 3,648,086 | A | * | 3/1972 | Renner | ..................... H02K 9/06 310/227 |
| 4,074,156 | A | * | 2/1978 | Widstrand | ............... H02K 9/06 165/47 |
| 6,737,780 | B1 | * | 5/2004 | Fisher | ..................... H02K 1/12 310/154.03 |

\* cited by examiner

*Primary Examiner* — Dang Le (57) ABSTRACT

A motor generally includes a housing, a cover, and a cooling fan. The cover defines multiple first inlet holes and is provided with an air collecting ring around the first inlet holes for collecting some of the air current generated by the cooling fan. Furthermore, the cover is provided with multiple wind-catching projections. The housing defines multiple second inlet holes near its opening. The cover is installed to the housing such that the wind-catching projections are respectively located above the second inlet holes of the housing, so as to collect some of the air current. Furthermore, multiple recesses are defined between the wind-catching projections, so that some of the air current may flow along the outer surface of the housing via the recesses to further cool down the housing.

2 Claims, 10 Drawing Sheets

MOTOR WITH HEAT DISSIPATION STRUCTURE

TECHNICAL FIELD OF THE INVENTION

The present invention relates to a motor with a heat dissipation structure and, more particularly, to a motor which can effectively dissipate the heat generated in its housing through multiple paths, so that heat is not easy to accumulate in the motor's housing, and thus the performance and service life of the motor can be increased.

DESCRIPTION OF THE PRIOR ART

In today's industry, motors are one of commonly used devices for providing mechanical power. However, while a motor is running, heat is easy to accumulate in the motor's housing. If the heat is not timely dissipated, the magnetic field provided by the magnets in the motor's housing will decrease, so that the performance of the motor can be gradually reduced. Besides, when the temperature in the motor rises to a certain level, the coils or enamel wires in the motor can be damaged, and this may cause a short circuit, and thus the motor may burn out. For preventing such a problem, a motor is usually provided with a cooling fan. However, the air current generated by the cooling fan of the motor can merely flow along the outer surface of the motor's housing, but cannot flow into the interior of the motor, and thus the capacity of dissipating the heat generated in the motor is limited. The problem of heat accumulation in the motor's housing has not yet been solved completely.

SUMMARY OF THE INVENTION

One object of the present invention is to provide a motor, which can effectively dissipate the heat generated in its housing through multiple paths.

According to one feature of the present invention, the motor generally includes a housing, a cover, a rotating shaft, and a cooling fan. The housing has a surrounding wall defining therein an inner space with a front opening and has a rear closure wall opposite to the front opening. The rear closure wall defines a central hole and a plurality of outlet holes. The cover, which closes the front opening of the housing, has a central hub defining a central hole and has a peripheral portion integrally formed around the central hub. The peripheral portion of the cover is provided with an air collecting ring around the central hub and defines a plurality of first inlet holes between the air collecting ring and the central hub, whereby a central portion of a whirling, ongoing air current generated by the cooling fan can flow through the space between the air collecting ring and the central hub of the cover and then flow through the first inlet holes of the cover to enter the inner space of the housing and finally flow out of the housing via the outlet holes for dissipating the heat generated in the housing.

According to another feature of the present invention, the surrounding wall of the housing defines a plurality of second inlet holes. The peripheral portion of the cover is provided with a plurality of wind-catching projections, each of which is formed as a bulging layer having a roof and two slant walls at two opposite sides of the roof. The two slant walls are formed integrally with the peripheral portion of the cover. As such, an air guiding channel is defined between the roof, the two slant walls, and the peripheral portion of the cover. The cover is installed to the housing such that each of the wind-catching projections is located above one of the second inlet holes and each of the air guiding channels faces towards the cooling fan; whereby an outer portion of the air current generated by the cooling fan can flow through the air guiding channels and the second inlet holes to enter the inner space of the housing for further dissipating the heat generated in the housing.

According to a further feature of the present invention, a recess is defined between two adjacent wind-catching projections, so that some of the outer portion of the air current generated by the cooling fan, which does not enter the inner space of the housing, may flow along the outer surface of the surrounding wall of the housing to cool down the housing.

According to one advantage of the present invention, the motor can be used in a high-temperature environment without being damaged. In a test, the motor was continuously operated in a closed space of 70 degrees C. for a long time without burning out.

Other objects, advantages, and novel features of the present invention will become more apparent from the following detailed description when taken in conjunction with the accompanying drawings.

DETAILED DESCRIPTION OF THE PREFERRED EMBODIMENTS

Since the structure and operational principles of a motor have been known widely, a detailed description for the constituent parts thereof is not provided in the following paragraphs.

Figure 1:
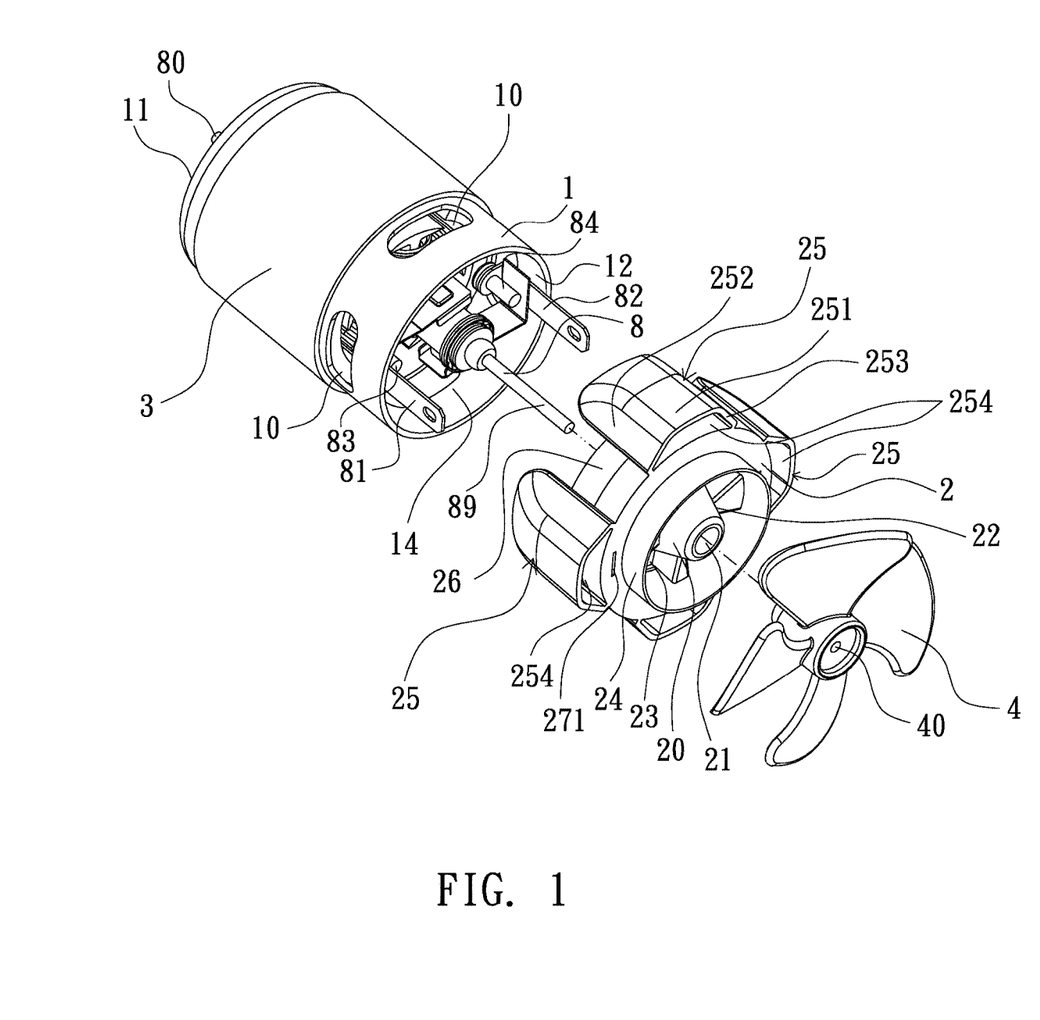
FIG. 1 shows an exploded view of a motor according to one embodiment of the present invention.
Figure 2:
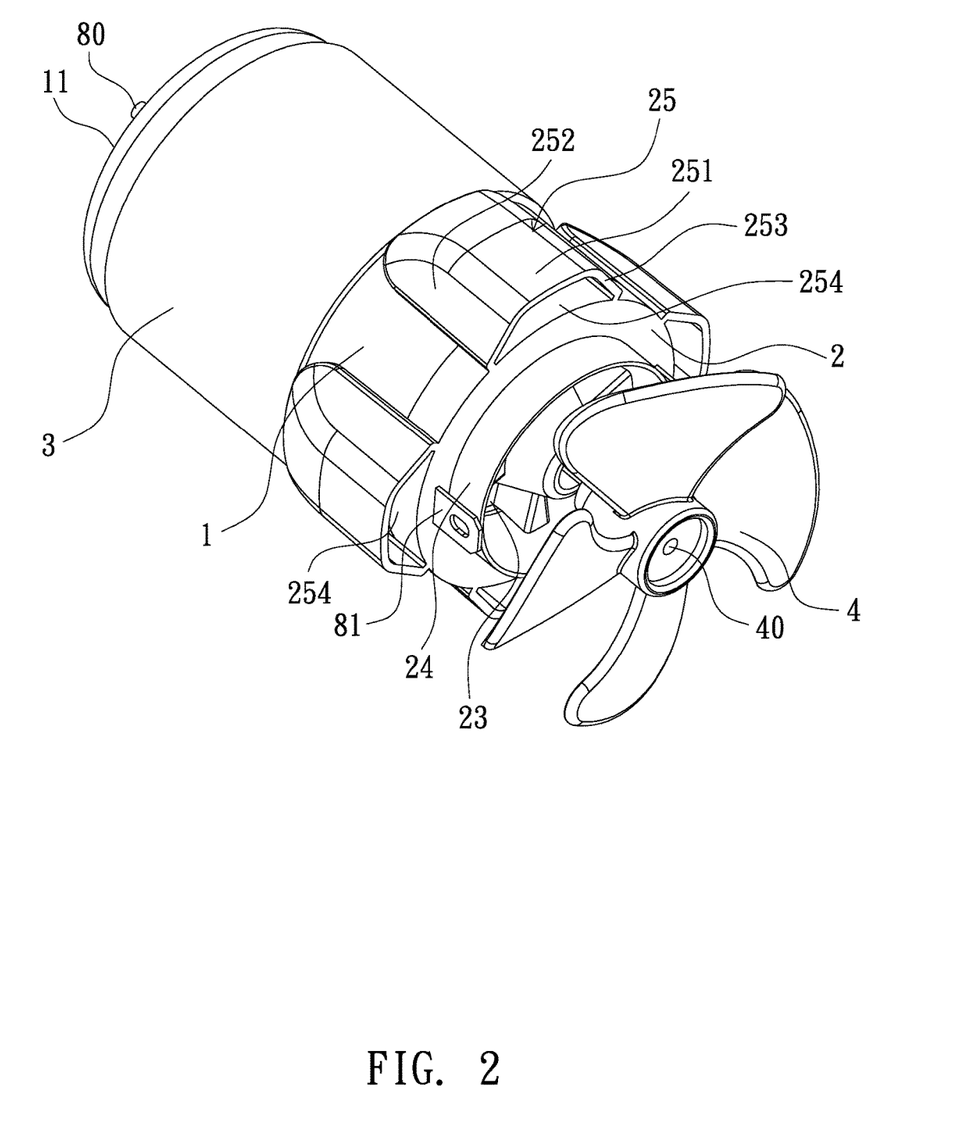
FIG. 2 shows a 3-dimensional view of the motor.
Figure 3:
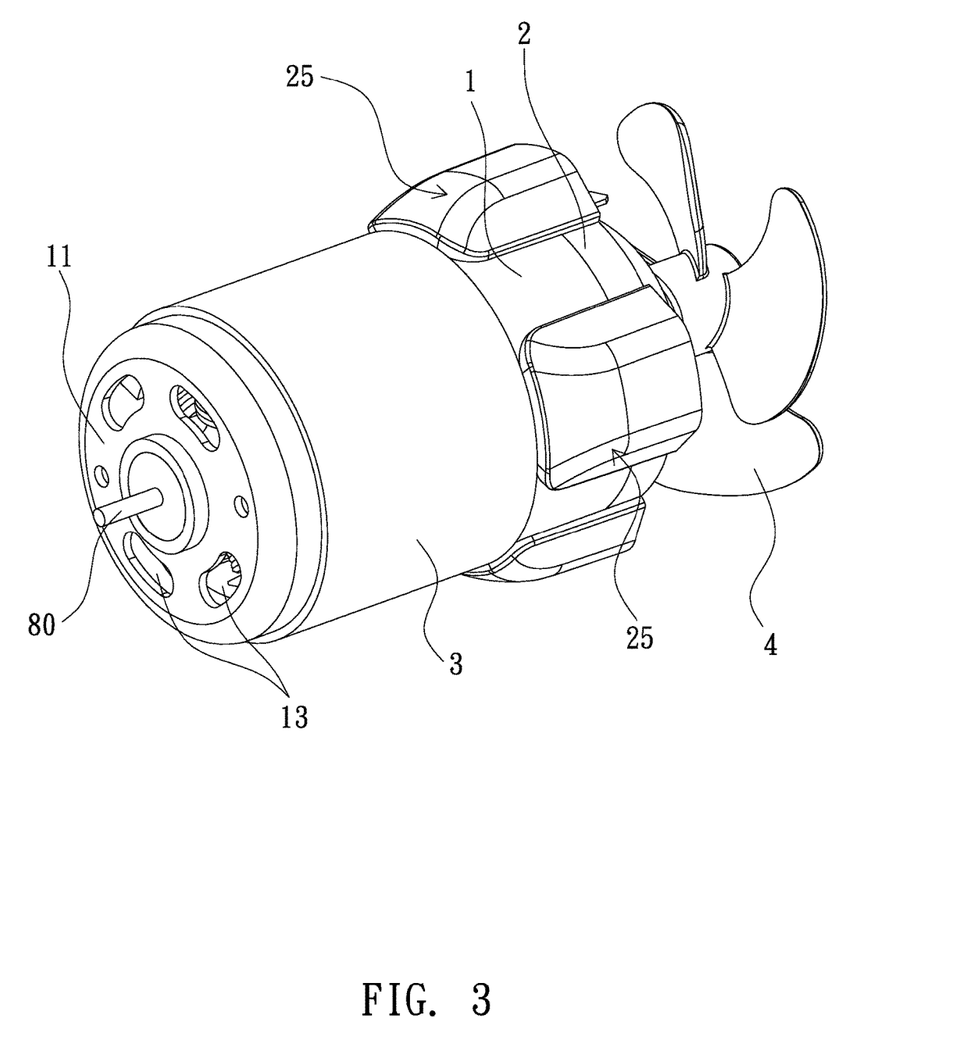
FIG. 3 shows another 3-dimensional view of the motor, which is viewed from a different angle than FIG. 2.
Figure 7:
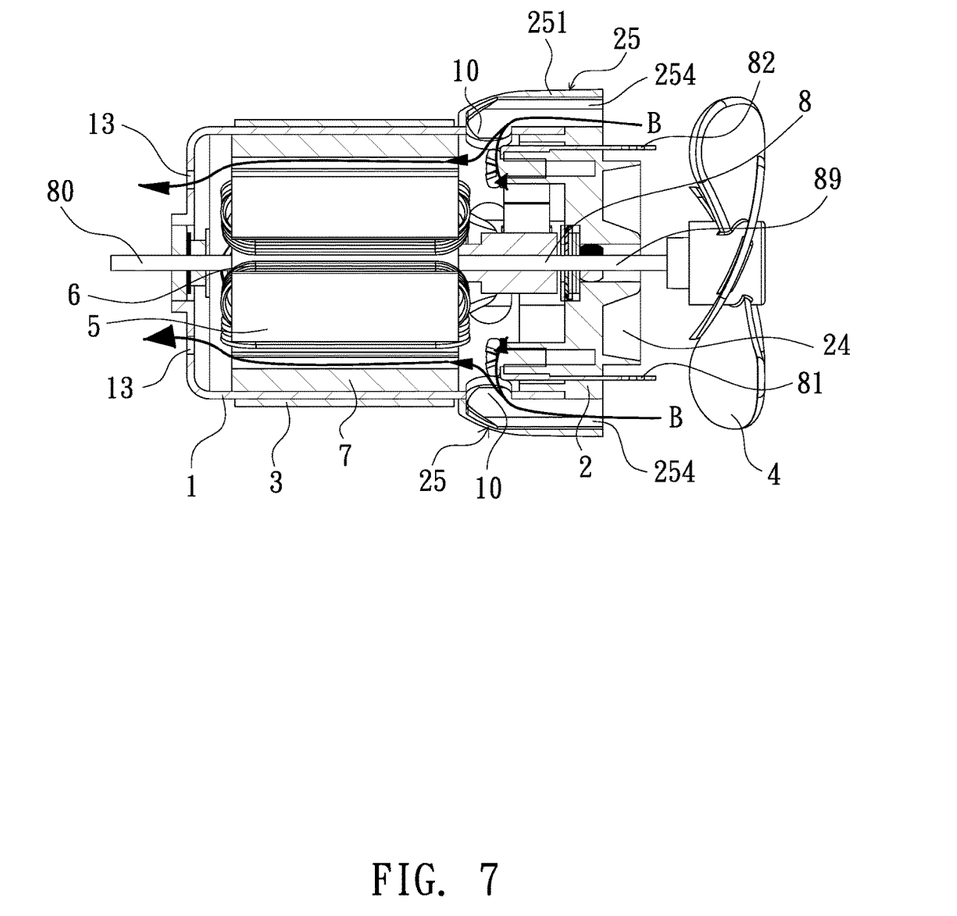
FIG. 7 shows a sectional view of the motor taken along line A-A in FIG. 6, wherein some of the air current, which follows the airflow path (B) to enter the motor's housing for dissipating the heat generated in the motor, is manifested.

Referring first to FIGS. 1 through 3, a motor according to one embodiment of the present invention is shown, which generally includes a housing 1, a cover 2, a rotating shaft 8, and a cooling fan 4. The housing 1 has a surrounding wall, which defines therein an inner space 14 with a front opening 12, and has a rear closure wall 11 opposite to the front opening 12. The rear closure wall 11 defines a central hole, in which a bearing may be mounted, and a plurality of outlet holes 13 around the central hole. The surrounding wall of the housing 1 defines a plurality of exit holes 10, through which outside air may enter the inner space 14 of the housing 1. Furthermore, a rotor 5, coils 6 and magnets 7, which are necessary elements for a motor, are provided in the inner space 14 of the housing 1 (see FIG. 7). The rotating shaft 8 is mounted across the inner space 14 of the housing 1, wherein the rotating shaft 8 has a first end 80 which is inserted through the central hole of the rear closure wall 11 for connecting with a transmission mechanism (not shown) for providing necessary mechanical power. The rotating shaft 8 has a second end 89 which is inserted out of the front opening 12 of the housing 1 to be fitted with the cooling fan 4, as will be further illustrated below. A magnetically permeable sleeve 3, which can be made of metal, is closely fitted around the outer surface of the surrounding wall of the housing 1, to increase the performance of the motor.

Figure 4:
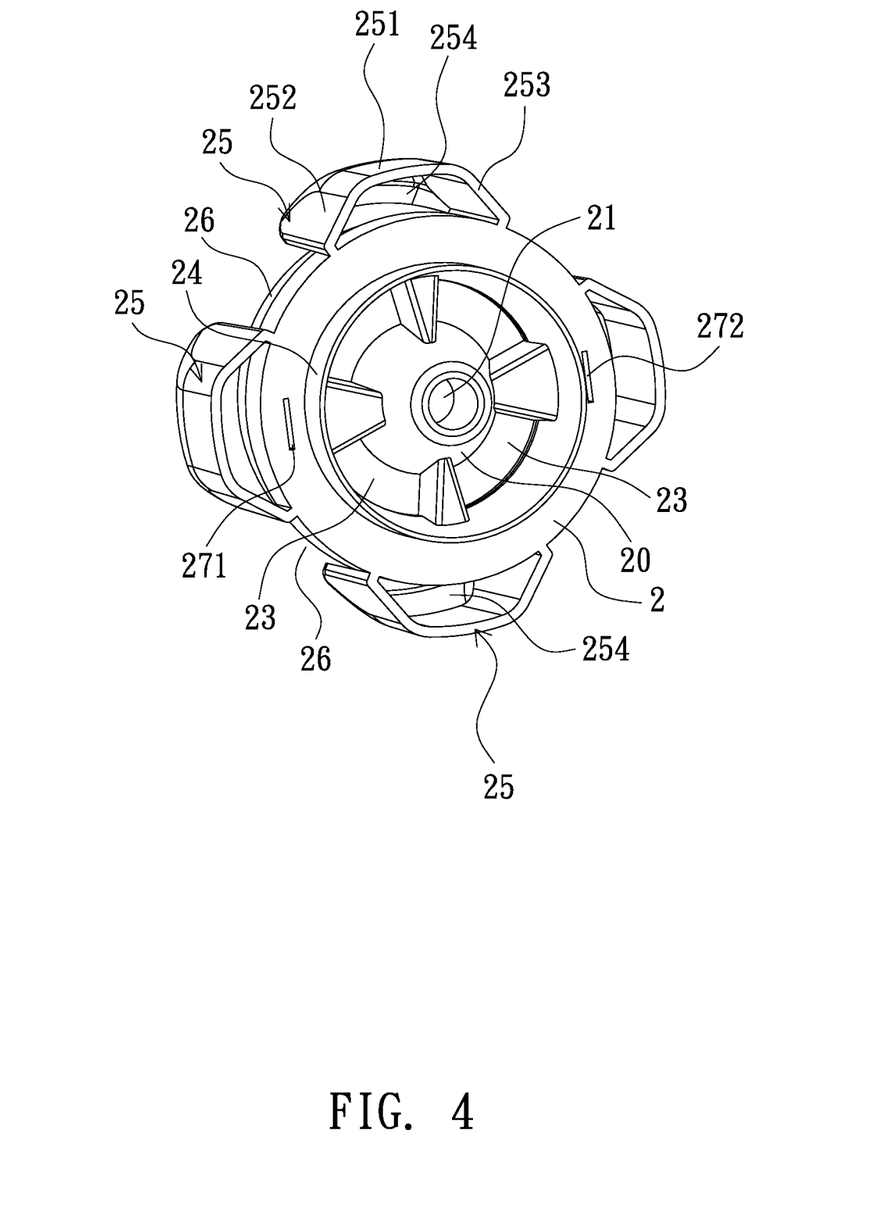
FIG. 4 shows a 3-dimensional view of a cover used in the motor.
Figure 5:
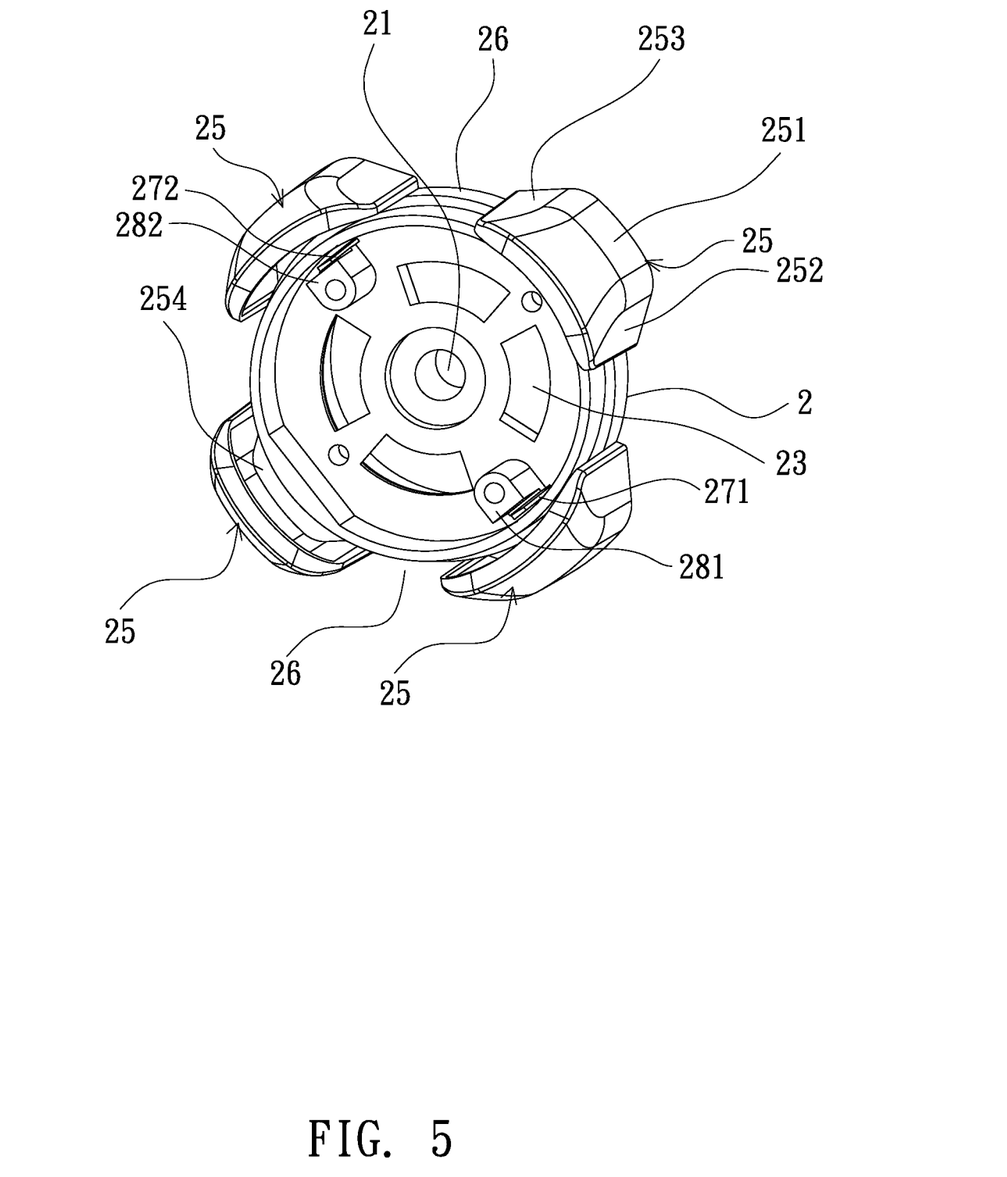
FIG. 5 shows another 3-dimensional view of the cover used in the motor, which is viewed from a different angle than FIG. 4.

FIGS. 4 and 5 show the cover 2 used in the motor of the present invention, wherein the cover 2 has a central hub 20, which has a conical surface 22 and defines a central hole 21, and a peripheral portion integrally formed around the central hub 20. The central hub 20 tapers off from its round base which is formed integrally with the peripheral portion of the cover 2; namely, the diameter of a cross section of the central hub 20 is gradually reduced as compared to the round base of the central hub 20. The peripheral portion of the cover 2 is provided with an air collecting ring 24 around the central hub 20, and defines a plurality of inlet holes 23 between the air collecting ring 24 and the central hub 20. The air collecting ring 24 can be formed integrally with the peripheral portion of the cover 2. The cover 2 is provided at an outer rim of its peripheral portion with a plurality of wind-catching projections 25, each of which is formed as a bulging layer having a roof 251 and two slant walls 252, 253 at two opposite sides of the roof 251. The two slant walls 252, 253 are formed integrally with the peripheral portion of the cover 2. Thus, an air guiding channel 254 is defined between the roof 251, the two slant walls 252, 253, the peripheral portion of the cover 2. When the cover 2 is installed to the housing 1, each of the wind-catching projections 25 is located above one of the inlet holes 10 of the housing 1 and each of the air guiding channels 254 faces towards the cooling fan 4. Between two adjacent wind-catching projections 25, there is formed a recess 26 which allows air to flow along the outer surface of the housing 1 or the sleeve 3. Furthermore, the cover 2 is provided with two mounting tubes 281, 282 at an inner surface of the peripheral portion thereof, and defines two through holes 271, 272 (see FIG. 5). When the cover 2 is installed to the housing 1, two electrical terminal blades 81, 82 provided in the housing 1 can be inserted through the two through holes 271, 272 of the cover 2, while two fixing dowel rods 83, 84 provided in the housing 1 can be inserted into the two mounting tubes 281, 282 of the cover 2, so that the cover 2 closes the front opening 12 of the housing 1, and electrical connection for the motor is facilitated. While the cover 2 is being installed to the housing 1, the second end 89 of the rotating shaft 8 can be inserted through the central hole 21 of the central hub 20 of the cover 2, wherein a bearing (not shown) may be provided in the central hub 20 of the cover 2 and fitted with the second end 89 of the rotating shaft 8.

As shown in FIG. 1, the cooling fan 4 defines a central hole 40, into which the second end 89 of the rotating shaft 8 extending out of the central hole 21 of the cover 2 can be fitted, so that the cooling fan 4 is attached to and rotated together with the rotating shaft 8.

Figure 6:
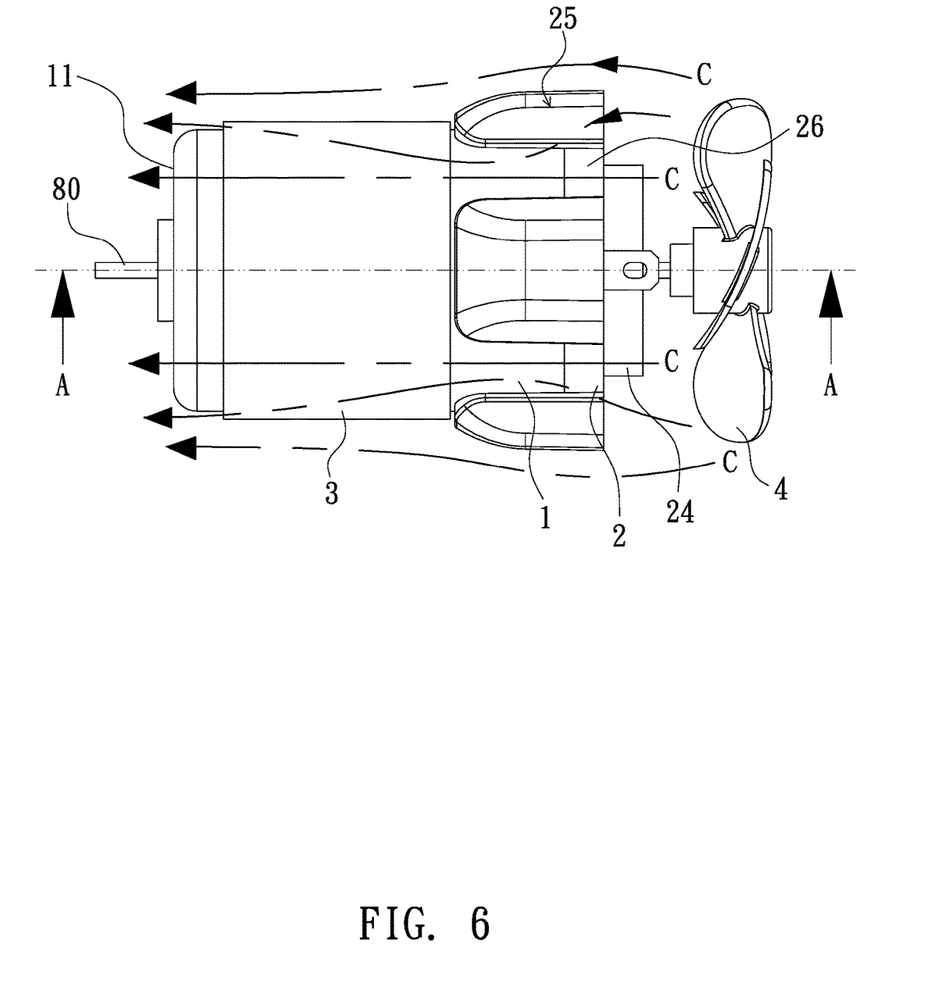
FIG. 6 shows a side view of the motor, wherein some of the air current generated by the cooling fan, which follows the airflow path (C) to flow along the outer surface of the motor's housing via recesses between wind-catching projections to cool down the housing, is manifested.
Figure 8:
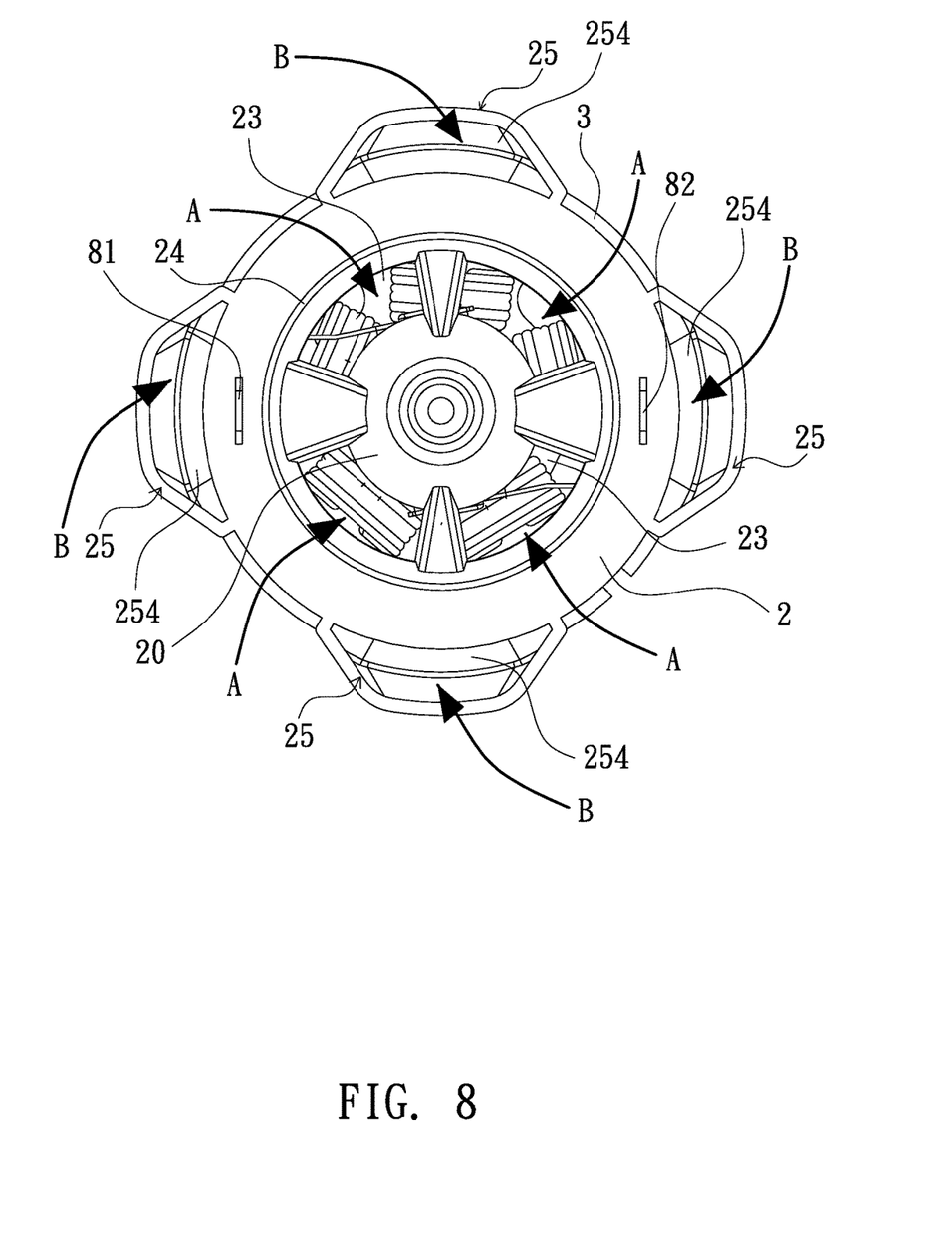
FIG. 8 shows a front view of the motor, wherein different portions of the air current, which respectively follow the airflow paths (A) (B) to enter the motor's housing for dissipating the heat generated in the motor, are manifested.
Figure 9:
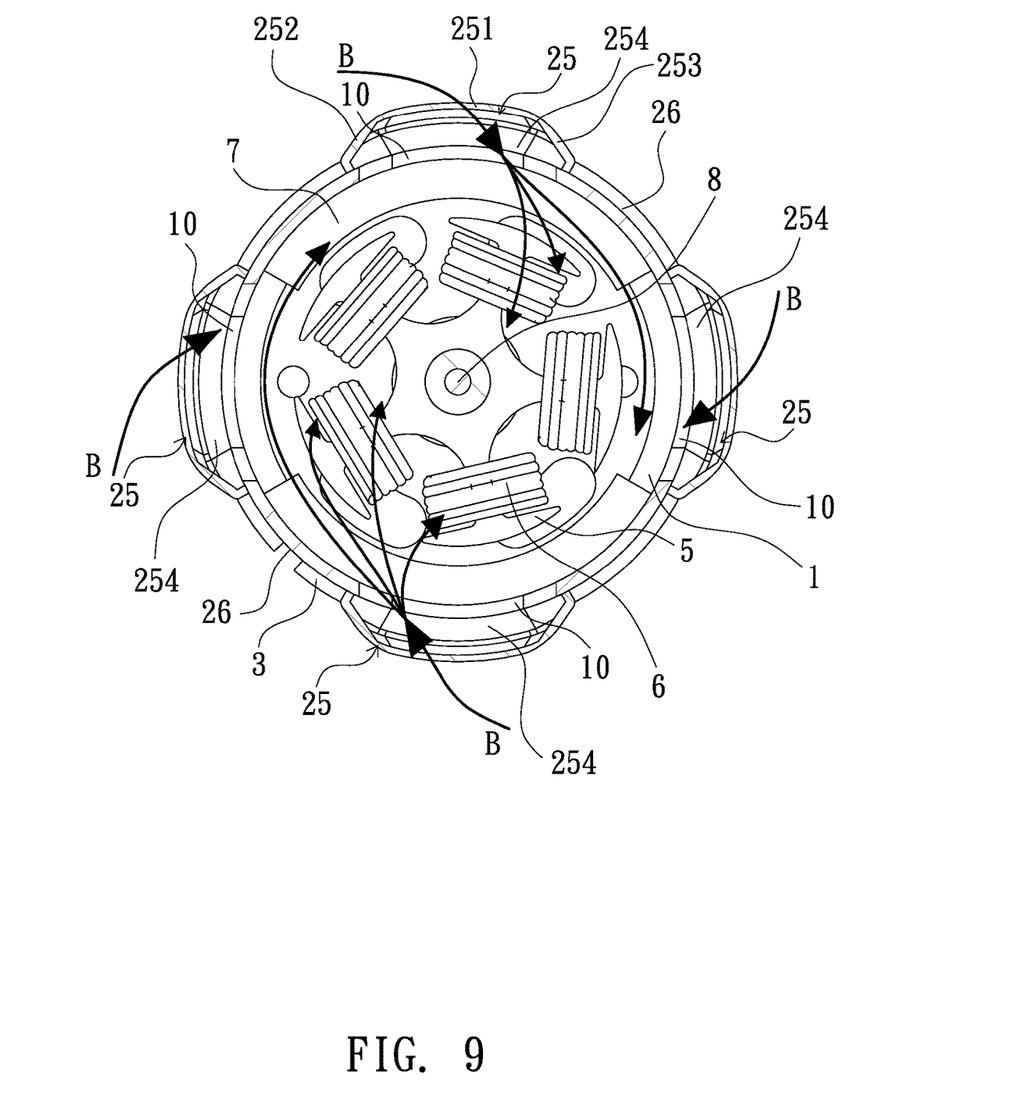
FIG. 9 shows a sectional view of the motor, wherein some of the air current, which follows the airflow path (B) to enter the motor's housing for dissipating the heat generated in the motor, is manifested.
Figure 10:
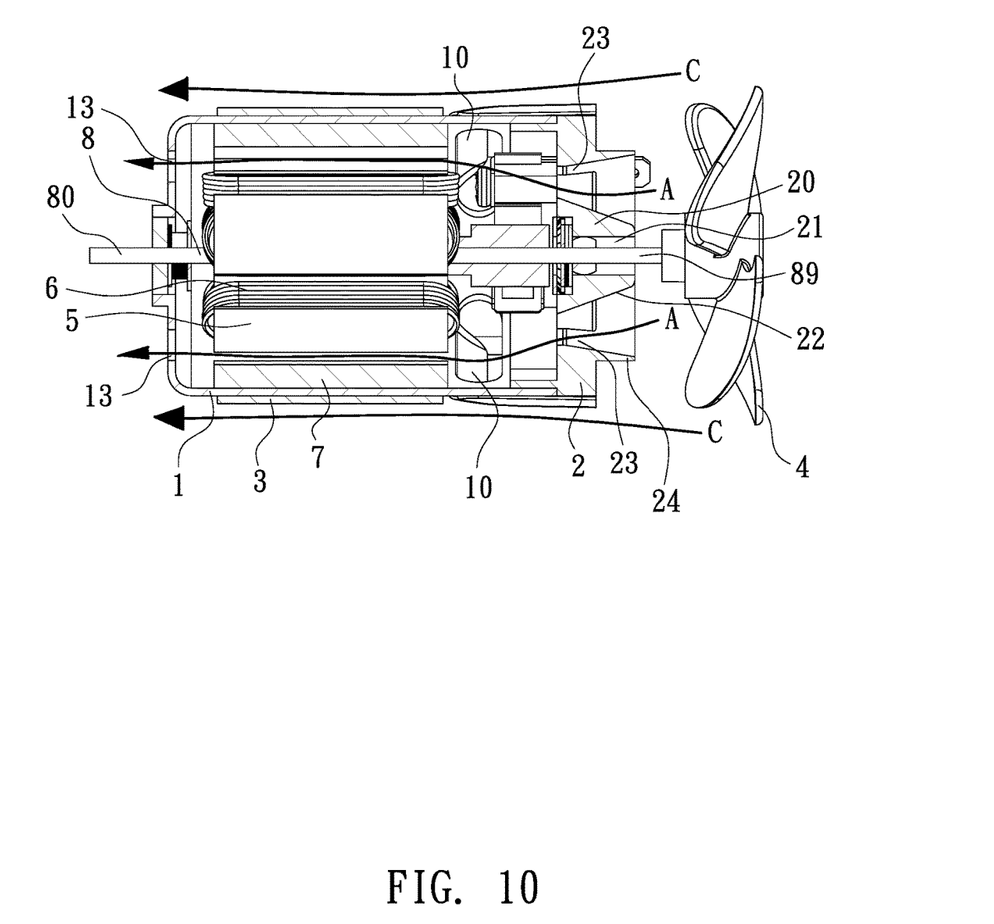
FIG. 10 shows a sectional view of the motor, wherein some of the air current, which follows the airflow path (A) to enter the motor's housing for dissipating the heat generated in the motor, and some of the air current, which follows the airflow path (C) to cool down the motor's housing for dissipating the heat generated in the motor, are manifested.

FIGS. 2 and 3 show one embodiment of the motor being assembled from the housing 1, the cover 2, and the cooling fan 4. When the motor is started, the cooling fan 4 can be rotated together with the rotating shaft 8 to generate a whirling, ongoing air current towards the cover 2, so that the air at the right side of the cooling fan 4 can be forced to flow into the left side of the cooling fan 4 (see FIG. 6). In particular, the air current can enter the inner space 14 of the housing 1 easily, and the heat generated in the housing 1 can be dissipated effectively through multiple paths (see FIGS. 6 through 10). A central portion of the air current generated by the cooling fan 4 can be guided by the air collecting ring 24 of the cover 2 and the conical surface 22 of the central hub 20 to smoothly flow through the space between the air collecting ring 24 and the conical surface 22, and then to pass through the associated inlet holes 23 to enter the inner space 14 of the housing 1, as indicated by the airflow path (A) shown in FIGS. 8 and 10. In addition, an outer portion of the air current, which is outside the area of the air collecting ring 24 of the cover 2, can be divided into two sub-portions of air, one of which may follow the airflow path (B) (see FIG. 7) while the other of which may follow the airflow path (C) (see FIG. 6). The sub-portion of the air current which follows the airflow path (B) may flow through the air guiding channels 254 and the corresponding inlet holes 10 to enter the inner space 14 of the housing 1, so that heat is not easy to accumulate in the housing 1 (see FIGS. 7, 8 and 9). The sub-portion of the air current which follows the airflow path (C) may flow along the outer surface of the housing 1 or the sleeve 3 via the recesses 26 between the wind-catching projections 25 of the cover 2 (see FIGS. 6 and 10), so that the housing 1 can be effectively cooled down to facilitate dissipation of the heat generated in the housing 1. In this embodiment, the air current which has entered the inner space 14 of the housing 1 can flow out of the housing 1 via the outlet holes 13 (see FIGS. 7 and 10), so that the heat generated in the housing 1 can be taken away with the leaving air current. The multiple airflow paths (A), (B) and (C) allow the heat generated in the housing 1 to dissipate more effectively, so that the motor can be prevented from burning out.

As a summary, the inlet holes 23 of the cover 2 allows the motor of the present invention to provide an airflow path (A) via which a central portion of the air current generated by the cooling fan 4 enters the inner space 14 of the housing 1 to dissipate the heat generated in the housing 1. Furthermore, the air guiding channels 254 of the wind-catching projections 25 of the cover 2 and the inlet holes 10 of the housing 1 allow the motor of the present invention to provide another airflow path (B) via which one sub-portion of an outer portion of the air current enters the inner space 14 of the housing 1. Still furthermore, the recesses 26 between the wind-catching projections 25 of the cover 2 allow the motor of the present invention to provide a further airflow path (C) via which another sub-portion of the outer portion of the air current flows along the outer surface of the housing 1 to lower the temperature of the housing 1 and thus to increase the capacity of dissipating the heat generated in the housing 1. Through multiple paths for heat dissipation, heat is not easy to accumulate in the housing 1 of the motor; therefore, maximum power output of the motor can be achieved, and thus the performance and service life of the motor can be increased. Even though the motor is operated in a high-temperature environment, it will not burn out. These features render the motor of the present invention useful and inventive.

I claim:

1. In a motor including a housing, a cover, a rotating shaft, and a cooling fan, wherein the housing has a surrounding wall defining therein an inner space with a front opening and has a rear closure wall opposite to the front opening, the rear closure wall defining a central hole and a plurality of outlet holes; the cover, which closes the front opening of the housing, has a central hub defining a central hole and has a peripheral portion integrally formed around the central hub; the rotating shaft is mounted across the inner space of the housing, the rotating shaft having a first end which is inserted through the central hole of the rear closure wall and having a second end which is inserted through the central hole of the central hub of the cover; the cooling fan is fixed to the second end of the rotating shaft, so that the cooling fan is rotated together with the rotating shaft; wherein the improvement comprises: the peripheral portion of the cover is provided with an air collecting ring around the central hub and defines a plurality of first inlet holes between the air collecting ring and the central hub, whereby a central portion of a whirling, ongoing air current generated by the cooling fan can flow through the space between the air collecting ring and the central hub of the cover and then flow through the first inlet holes of the cover to enter the inner space of the housing and finally flow out of the housing via the outlet holes for dissipating the heat generated in the housing, wherein the surrounding wall of the housing defines a plurality of second inlet holes; the cover is provided at an outer rim of its peripheral portion with a plurality of wind-catching projections, each of which is formed as a bulging layer having a roof and two slant walls at two opposite sides of the roof, the two slant walls formed integrally with the peripheral portion of the cover, thus defining an air guiding channel between the roof, the two slant walls, and the peripheral portion of the cover, the cover being installed to the housing such that each of the wind-catching projections is located above one of the second inlet holes and each of the air guiding channels faces towards the cooling fan; whereby an outer portion of the air current generated by the cooling fan can flow through the air guiding channels and the second inlet holes to enter the inner space of the housing for dissipating the heat generated in the housing.

2. The motor of claim 1, wherein a recess is defined between two adjacent ones of the wind-catching projections, so that some of the outer portion of the air current generated by the cooling fan, which does not enter the housing, may flow along the outer surface of the surrounding wall of the housing to cool down the housing.

* * * * *